(12) United States Patent
Peake (10) Patent No.: US 7,706,976 B1
(45) Date of Patent: Apr. 27, 2010

(54) POSITION BASED VELOCITY ESTIMATOR

(75) Inventor: John William Peake, San Francisco, CA (US)

(73) Assignee: Trimble Navigation, Ltd., Sunnyvale, CA (US)

( * ) Notice: Subject to any disclaimer, the term of this patent is extended or adjusted under 35 U.S.C. 154(b) by 812 days.

(21) Appl. No.: 11/408,480

(22) Filed: Jul. 26, 2006

(51) Int. Cl.
*G01C 21/00* (2006.01)

(52) U.S. Cl. .................. 701/213; 701/200; 701/207; 701/214; 701/215; 701/216; 342/350; 342/385; 342/386; 342/450; 340/988

(58) Field of Classification Search ............... 701/213, 701/200, 207, 214, 215, 216
See application file for complete search history.

(56) References Cited

U.S. PATENT DOCUMENTS

| | | | | |
|---|---|---|---|---|
| 5,563,607 | A * | 10/1996 | Loomis et al. | 342/357.03 |
| 5,602,741 | A * | 2/1997 | Talbot et al. | 701/213 |
| 5,610,614 | A * | 3/1997 | Talbot et al. | 342/352 |
| 5,678,182 | A * | 10/1997 | Miller et al. | 455/12.1 |
| 5,748,145 | A * | 5/1998 | Talbot et al. | 342/357.04 |
| 6,055,477 | A * | 4/2000 | McBurney et al. | 701/207 |
| 6,229,478 | B1 * | 5/2001 | Biacs et al. | 342/357.03 |
| 6,342,854 | B1 * | 1/2002 | Duffett-Smith et al. | 342/457 |
| 6,530,269 | B1 | 3/2003 | Colosky | |
| 6,928,116 | B2 | 8/2005 | Weon | |
| 6,950,059 | B2 * | 9/2005 | Rapoport et al. | 342/357.03 |
| 7,256,730 | B2 * | 8/2007 | Hernandez-Pajares et al. | 342/357.03 |
| 7,362,265 | B2 * | 4/2008 | Weill | 342/357.06 |
| 2003/0195008 | A1 * | 10/2003 | Mohi et al. | 455/456.5 |
| 2004/0130485 | A1 * | 7/2004 | Rapoport et al. | 342/357.03 |
| 2005/0212697 | A1 * | 9/2005 | Brabec et al. | 342/357.04 |
| 2006/0279455 | A1 * | 12/2006 | Bird et al. | 342/357.06 |
| 2007/0052583 | A1 * | 3/2007 | Zhodzishsky et al. | 342/357.06 |
| 2007/0171124 | A1 * | 7/2007 | Weill | 342/357.06 |
| 2008/0284643 | A1 * | 11/2008 | Scherzinger et al. | 342/357.02 |

\* cited by examiner

*Primary Examiner*—Khoi Tran
*Assistant Examiner*—Jonathan Sample
(74) *Attorney, Agent, or Firm*—Boris G. Tankhilevich (57) ABSTRACT

A method of determining speed and heading of a rover/rover having one degree of freedom comprising the following steps: (A) determining a rover position coordinates using at least one source of a radio position measurements; (B) storing a set of statistically different rover points in a memory block, and (C) using a subset of rover points including a plurality of stored rover points and a current rover point to determine a speed and a heading of the rover. It is assumed that each rover point comprises a time Epoch and a rover position determined at time Epoch, and that each pair of statistically different rover points comprises two rover positions separated by a statistically significant distance.

17 Claims, 3 Drawing Sheets

POSITION BASED VELOCITY ESTIMATOR

BACKGROUND OF THE INVENTION

1. Field of the Invention

The present invention is in the field of control systems, and more specifically, is in the field of position based velocity estimation.

2. Discussion of the Prior Art

When a rover is moving quickly, the conventional approach is to take a fix as often as possible (like every 100 to 200 msec) and to calculate an instantaneous rover direction vector based on two rover positions: a current rover position, and a referenced future rover position as to where it should be at certain point in time. This approach works well when the rover is moving along at a relatively moderate speed so that the distance between fixes is greater than the error in the fix determination. For example, at 99 inches per second, or at 9 km/hour, if one takes a fix 10 times per second, the rover has moved about 10 inches between fixes. If a fix accuracy is 2 inches, then the position fix "noise" is about 20%. This is an acceptable level of noise because it can be filtered out.

On the other hand, if a rover is moving slowly (for example, at 1 km/hour, or at 11 inches per second), and if a fix is taken approximately 10 times per second, the rover will have moved about 1 inch between two fixes. If a fix accuracy is the same, that is about 2 inches, the position fix noise is 200%. This is an unacceptable level of noise.

SUMMARY OF THE INVENTION

The present invention addresses the above-mentioned problem by using position differences rather than time differences to make a decision at what point in time to recalculate the direction at which a rover is moving when it moves slowly.

One aspect of the present invention is directed to a method of determining speed and heading of a rover/rover having one degree of freedom (for example, a four wheeled rover with steering control).

In one embodiment, the method of the present invention comprises the following steps: (A) determining a rover position coordinates using at least one source of a radio position measurements; (B) storing a set of statistically different rover points in a memory block; and (C) using a subset of rover points is including a plurality of stored rover points and a current rover point to determine a speed and a heading of the rover. In this embodiment of the present invention, each rover point comprises a time Epoch and a rover position determined at the time Epoch. In this embodiment of the present invention, each pair of statistically different rover points comprises two rover positions separated by a statistically significant distance.

In one embodiment of the present invention, the step (A) further comprises the step (A1) of selecting the source of radio position measurements from the group consisting of: {a carrier differential SATPS; a code differential SATPS; an autonomous SATPS; an Inertial Navigation System (INS); and a Pseudolite-Based Positioning System}.

In one embodiment of the present invention, the step (B) further comprises the following steps: (B1) storing an initial rover point in a memory block; (B2) determining whether a subsequent rover point is a statistically different rover point by calculating a distance between the subsequent rover position and a previous rover position; and (B3) if the calculated distance is greater than a first predetermined threshold $D_{store}$, making a decision to calculate and to store the subsequent rover point. The steps (B2-B3) are preferably repeated.

In one embodiment of the present invention, the step (B3) further comprises the step (B3, 1) of determining the first predetermined threshold by using a set of parameters selected from the group consisting of: {a radio source positioning noise level; and a rover kinematic parameter}; wherein the rover kinematic parameter is selected from the group consisting of: {a minimum turning radius of the rover; and a baseline of the rover}.

In one embodiment of the present invention, wherein the memory block further comprises an N point circular buffer, N being an integer, the step (B) of storing the set of statistically different rover points further comprises the following steps: (B5) storing an initial rover point in the memory block; (B6) determining whether a current rover point is a statistically different rover point by calculating a distance between the current rover position and a newest stored rover position that meets the heading spacing requirement; (B7) if the calculated distance is greater than the first predetermined threshold, making a decision to calculate and to insert the current rover point in the N point circular buffer; and (B8) if the calculated distance is greater than the first predetermined threshold, making a decision to discard a first stored rover point. The steps (B6-B8) are preferably repeated.

In one embodiment of the present invention, the step (C) further comprises the following step (C1): if a distance between at least two stored rover positions exceeds a second predetermined threshold $D_{heading}$, using at least two statistically different rover points to determine a current heading of the rover by computing an angle component of a vector distance between at least two stored statistically different rover positions. In another embodiment of the present invention, the step (C) further comprises the following step (C2): determining a current heading of the rover by computing an angle component of a vector distance between at least one stored rover position and the current rover position.

In one embodiment of the present invention, the step (C) further comprises the following step (C3): if a distance between at least two stored rover positions exceeds the second predetermined threshold $D_{heading}$, determining a current speed of the rover by computing a magnitude component of a vector distance between at least two stored rover positions, and by dividing the computed magnitude component of the vector distance between two stored rover points by a time difference between two stored rover points. In another embodiment of the present invention, the step (C) further comprises the following step (C4): determining a current speed of the rover by computing a magnitude component of a vector distance between at least one stored rover position and the current rover position, and by dividing the computed magnitude component of the vector distance between at least one stored rover position and the current rover position by a time difference between at least one stored rover point and the current rover point.

In one embodiment of the present invention, the step (C1) further comprises the following steps: the step (C1, 1) of repeating step (C1) for a substantially sufficient number of pairs of stored rover points; and the step (C1, 2) of minimizing an error in determination of the current heading of the rover by optimizing the step (C1, 1) for a plurality of obtained headings of the rover. In another embodiment of the present invention, the step (C2) further comprises the following steps: the step (C2, 1) of repeating the step (C2) for a substantially sufficient number of the stored rover points; and the step (C2, 2) of minimizing an error in determination of the current heading of the rover by optimizing the step (C2, 1) for a plurality of obtained headings of the rover.

In one embodiment of the present invention, the step (C1, 2) further comprises the step (C1, 2, 1) of minimizing an error parameter in determination of the current heading of the rover by fitting a straight line in a linear regression; wherein the error parameter is selected from the group consisting of: {a standard deviation; and a variance}. In another embodiment of the present invention, the step (C1, 2) further comprises the following steps: the step (C1, 2, 2) of minimizing the error parameter by fitting a circular arc curve line in a circular regression; wherein the error parameter is selected from the group consisting of: {a standard deviation; and a variance}; and the step (C1, 2, 3) of determining a current heading of the rover by using a stored rover position on the curve closest to the current rover position. Yet, in one more embodiment of the present invention, the step (C1, 2) further comprises the following steps: the step (C1, 2, 4) of minimizing the error parameter by fitting a smooth curve line in an optimal sense; wherein the error parameter is selected from the group consisting of: {a standard deviation; and a variance}; and the step (C1, 2, 5) of finding an optimal point on the curve to determine a current heading of the rover.

In one embodiment of the present invention, the step (C2, 2) further comprises the step (C2, 2, 1) of minimizing an error parameter in determination of the current heading of the rover fitting a straight line in a linear regression; wherein the error parameter is selected from the group consisting of: {a standard deviation; and a variance}. In another embodiment of the present invention, the step (C2, 2) further comprises the following steps: the step (C2, 2, 2) of minimizing the error parameter by fitting a circular arc curve line in a circular regression; wherein the error parameter is selected from the group is consisting of: {a standard deviation; and a variance}; and the step (C2, 2, 3) of determining a current heading of the rover by using a stored rover position on the curve closest to the current rover position. Yet, in one more embodiment of the present invention, the step (C2, 2) further comprises the following steps: the step (C2, 2, 4) of minimizing the error parameter by fitting a smooth curve line in an optimal sense; wherein the error parameter is selected from the group consisting of: {a standard deviation; and a variance}; and the step (C2, 2, 5) of finding an optimal point on the curve to determine a current heading of the rover.

Another aspect of the present invention is directed to an apparatus for determining speed and heading of a rover/rover having one degree of freedom.

In one embodiment, the apparatus of the present invention comprises: (A) a means for determining a rover position coordinates; (B) a means for storing a set of statistically different rover points; and (C) a means for determining a speed and a heading of the rover by using a subset of rover points including a plurality of stored rover points and a current rover point.

In one embodiment of the present invention, the means (A) further comprises: (A1) at least one source of a radio position measurements. In this embodiment of the present invention, each source of radio position measurements is selected from the group consisting of: {a carrier differential SATPS; a code differential SATPS; an autonomous SATPS; an Inertial Navigation System (INS); and a Pseudolite-Based Positioning System}.

In one embodiment of the present invention, the means (B) further is comprises: (B1) a memory block configured to store the set of statistically different rover points; and (B2) a memory computer means. In this embodiment of the present invention, the memory computer means is configured to perform the algorithm comprising at least the following steps: calculating a distance between the subsequent rover position and a previous rover position; and making a decision to calculate the subsequent rover point in the memory block if the calculated distance is greater than a first predetermined threshold $D_{store}$.

In one embodiment of the present invention, the means (B) further comprises: (B3) an N point circular buffer configured to store the set of statistically different rover points, N being an integer; and (B4) a memory computer means. In this embodiment of the present invention, the memory computer means is configured to perform the algorithm comprising at least the following steps: storing an initial rover point in the N point circular buffer; determining whether a current rover point is a statistically different rover point by calculating a distance between the current rover position and a newest stored rover position that meets the heading spacing requirement; if the calculated distance is greater than the first predetermined threshold $D_{store}$, making a decision to insert the current rover point in the N point circular buffer; and if the calculated distance is greater than the first predetermined threshold $D_{store}$, making a decision to discard a first stored rover point.

In one embodiment of the present invention, the means (C) further comprises: (C1) a computer means configured to calculate the speed and the heading of the rover by using the subset of rover points including the plurality of stored rover points and the current rover point.

In one embodiment of the present invention, the means (C) further comprises: (C2) a computer means configured to perform the algorithm comprising at least the following step: if a distance between at least two stored rover positions exceeds a second predetermined threshold $D_{heading}$, determining a current heading of the rover by computing an angle component of a vector distance between at least two stored statistically different rover positions.

In one embodiment of the present invention, the means (C) further comprises: (C3) a computer means configured to perform the algorithm comprising at least the following step: determining a current heading of the rover by computing an angle component of a vector distance between at least one stored rover position and the current rover position.

In one embodiment of the present invention, the means (C) further comprises: (C4) a computer means configured to perform the algorithm comprising at least the following steps: if a distance between at least two stored rover positions exceeds the second predetermined threshold $D_{heading}$, determining a current speed of the rover by computing a magnitude component of a vector distance between at least two stored rover positions, and by dividing the computed magnitude component of the vector distance between two stored rover points by a time difference between two stored rover points.

In one embodiment of the present invention, the means (C) further comprises: (C5) a computer means configured to perform the algorithm comprising at least the following steps: determining a current speed of the rover by computing a magnitude component of a vector distance between at least one stored rover position and the current rover position, and by dividing the computed magnitude component of the vector distance between at least one stored rover position and the current rover position by a time difference between at least one stored rover point and the current rover point.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
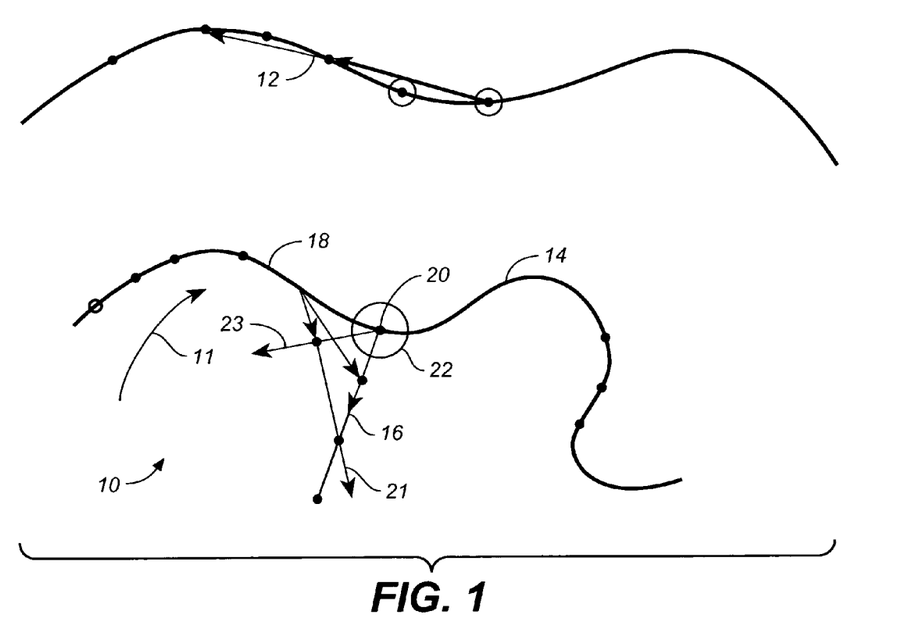
FIG. 1 illustrates the trajectory of a rover/rover having one degree of freedom for the purposes of the present invention.

In one embodiment of the present invention, FIG. 1 illustrates the trajectory 12 of a rover/rover having one degree of freedom. According to the present invention, the heading and speed of the rover cannot change without movement over distance because both the filtering and the trajectory of a rover are dependant on a distance covered. Thus, the trajectory 12 of the rover (of FIG. 1) can be parameterized by using only one parameter to avoid indefiniteness in heading. Indeed, as shown in FIG. 1, if the rover has a trajectory 11 that can be parameterized by using two parameters, the trajectory 11 could be split into two trajectories 18-16 and 16-14, each of which can be parameterized by using only one parameter. However, if this is the case, the rover at point 20 would have an indefinite heading (21 or 23) at low speed because of the sizable error circle 22 in the position determination at point 20. Thus, the distance-based filtering for a slow moving rover is more effective than a time-based filtering, as fully disclosed below.

Figure 2:
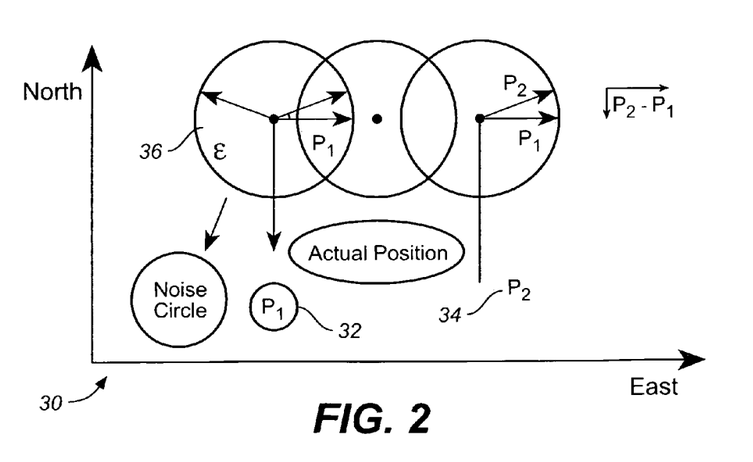
FIG. 2 depicts a rover having actual position coordinates in the coordinates system (X=East, Y=North) at point $P_1$ within a noise circle having radius $\epsilon$ and heading to point $P_2$ for the purposes of the present invention.

FIG. 2 depicts a rover having actual position coordinates in the coordinates system (X=East, Y=North) at point $P_1$ 32 within a noise circle having radius $\epsilon$ 36:

$$\vec{P}_1 = (E_1 + \epsilon; N_1 + \epsilon) \quad \text{(Eq. 1)}$$

and traveling from point $P_1$ 32 to point $P_2$ 34, wherein the rover has actual position coordinates at point $P_2$ 34 within a noise circle having the same radius $\epsilon$ 36:

$$\vec{P}_2 = (E_2 + \epsilon; N_2 + \epsilon) \quad \text{(Eq. 2)}$$

This is true if a level of spatial noise is small comparatively with the distance traveled.

The vector of velocity $\vec{V}$ can be determined as follows:

$$\vec{V} = \frac{\vec{P}_2 - \vec{P}_1}{\Delta t} = \frac{(E_2 - E_1 + 2\varepsilon, N_2 - N_1 + 2\varepsilon)}{\Delta t} \quad \text{(Eq. 3)}$$

Or:

$$|\vec{P}_2 - \vec{P}_1| = |\Delta t \times V| \gg \varepsilon \quad \text{(Eq. 4)}$$
$$\Delta t \to \infty$$

Thus, if the duration of time $\Delta t$ is long enough, the noise level $\epsilon$ becomes insignificant, and the heading $\psi$ of the rover at position $P_1$ 32 of FIG. 2 can be determined as follows:

$$\psi = \tan^{-1}\left(\frac{N_2 - N_1}{E_2 - E_1}\right) \quad \text{(Eq. 5)}$$

Thus, according to (Eq. 5), the solution to the problem of an indefiniteness in heading of a rover moving at a low speed (comparatively with the speed of the rover at which the level of fluctuations in position fixes determination is an acceptable one), is to memorize the position fixes obtained by a suitable navigation device for some time $\Delta t$, so that at sufficient duration of memorization the accuracy in the heading determination will exceed the given spatial noise level $\epsilon$.

Thus, based on the discussion given above, in one embodiment, the method of the present invention comprises the following steps (not shown): (A) determining a rover position coordinates using at least one source of a radio position measurements; (B) storing a set of statistically different rover points in a memory block for sufficient time duration so that the spatial noise level can be ignored; and (C) using a subset of rover points including a plurality of stored rover points and a current rover point to determine a speed and a heading of the rover. In this embodiment of the present invention, each rover point comprises a time Epoch and a rover position determined at the time Epoch. In this embodiment of the present invention, each pair of statistically different rover points comprises two rover positions separated by a statistically significant is distance as compared with the given noise level $\epsilon$.

In one embodiment of the present invention, the step (A) further comprises (not shown) the step (A1) of selecting the source of radio position measurements from the group consisting of: {an autonomous SATPS; a carrier differential SATPS; a code differential SATPS; an Inertial Navigation System (INS); and a Pseudolite-Based Positioning System}.

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency f1=1575.42 MHz (approximately nineteen centimeter carrier wavelength) and an L2 signal having a frequency f2=1227.6 MHz (approximately twenty-four centimeter carrier wavelength). These two frequencies are integral multiplies f1=1,540 f0 and f2=1,200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes and accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1= (1.602+9k/16) GHz and f2=(1.246+7k/16) GHz, where k=(1, 2, . . . 24) is the channel or satellite number. These frequencies lie in two bands at 1.597-1.617 GHz (L1) and 1,240-1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

As disclosed in the European Commission "White Paper on European transport policy for 2010", the European Union will develop an independent satellite navigation system Galileo as a part of a global navigation satellite infrastructure (GNSS).

The GALILEO system is based on a constellation of 30 satellites and ground stations providing information concerning the positioning of users in many sectors such as transport (rover location, route searching, speed control, guidance systems, etc.), social services (e.g. aid for the disabled or elderly), the justice system and customs services (location of suspects, border controls), public works (geographical information systems), search and rescue systems, or leisure (direction-finding at sea or in the mountains, etc.).

Reference to a Satellite Positioning System (SATPS) herein refers to a Global Positioning System, to a Global Orbiting Navigation System, to GALILEO System, and to any other compatible Global Navigational Satellite System (GNSS) satellite-based system that provides information by which an observer's position and the time of observation can be determined, all of which meet the requirements of the present invention, and to a ground based radio positioning system such as a system comprising of one or more pseudolite transmitters.

In one embodiment of the present invention, an autonomous SATPS receiver (not shown) can obtain position coordinates of a rover based on SATPS signal for the purposes of the present invention.

In one embodiment of the present invention, the SATPS receiver is comprises a differential GPS receiver (not shown). In differential position determination, many of the errors in the SATPS signals that compromise the accuracy of absolute position determination are similar in magnitude for stations that are physically close. The effect of these errors on the accuracy of differential position determination is therefore substantially reduced by a process of partial error cancellation. Thus, the differential positioning method is far more accurate than the absolute positioning method, provided that the distances between these stations are substantially less than the distances from these stations to the satellites, which is the usual case. Differential positioning can be used to provide location coordinates and distances that are accurate to within a few centimeters in absolute terms. The differential GPS receiver can include: (a) a real time code differential GPS; (b) a post-processing differential GPS; (c) a real-time kinematic (RTK) differential GPS that includes a code and carrier RTK differential GPS receiver.

The differential GPS receiver can obtain the differential corrections from different sources: {a Base Station; the Wide Area Augmentation System (WAAS); a Virtual Base station}.

In one embodiment of the present invention, the real time kinematic (RTK) differential GPS receiver (not shown) can be used to obtain the position locations of the rover with less than 2 cm accuracy.

The RTK differential GPS receiver receives the differential corrections from the Base Station 32 placed in a known location within (10-50) km by using a wireless communication device (not shown) and a wireless communication is link (not shown). For a high accuracy measurement, the number of whole cycle carrier phase shifts between a particular GPS satellite and the RTK GPS receiver is resolved because at the receiver every cycle will appear the same. Thus, the RTK GPS receiver solves in real time an "integer ambiguity" problem, that is the problem of determining the number of whole cycles of the carrier satellite signal between the GPS satellite being observed and the RTK GPS receiver. Indeed, the error in one carrier cycle L1 (or L2) can change the measurement result by 19 (or 24) centimeters, which is an unacceptable error for the centimeter-level accuracy measurements.

In one embodiment of the present invention, a pseudolite (not shown) can be used to obtain the position locations of the rover.

Pseudolites comprise a ground based radio positioning system working in any radio frequency including but not limited to the GPS frequencies and the ISM (industrial scientific medical) unlicensed operation band, including 900 MHZ, 2.4 GHz, or 5.8 GHz bands ISM bands, or in a radio location band such as the (9.5-10) GHz band. Pseudolites can be used for enhancing the GPS by providing increased accuracy, integrity, and availability.

The complete description of the pseudolite transmitters in GPS band can be found in "Global Positioning System: Theory and Applications; Volume II", edited by Bradford W. Parkinson and James J. Spilker Jr., and published in Volume 164 in "PROGRESS IN ASTRONAUTICS AND AERONAUTICS", by American Institute of Aeronautic and Astronautics, Inc., in 1966.

In one embodiment of the present invention, an INS (not shown) can be is used to obtain the position locations of the rover. The INS device suitable for the purposes of the present invention can be built by using a combination of accelerometers, magnetometers, a processor, and specifically designed software. Indeed, Acceleron Technology, Inc., located in San Francisco, Calif., has built small light weight, Inertial Navigation System (INS) using three accelerometers to measure three components of the local acceleration vector, three magnetometers to measure three components of the local gravitational vector, plus some software.

In one embodiment of the present invention, after the step (A) of determining a rover position coordinates using at least one source of a radio position measurements has been performed, the next step (B) (not shown) of storing a set of statistically different rover points in a memory block for sufficient time duration so that the noise level can be ignored, further comprises the following steps: (B1) storing an initial rover point in a memory block; (B2) determining whether a subsequent rover point is a statistically different rover point by calculating a distance between the subsequent rover position and a previous rover position; and (B3) if the calculated distance is greater than a first predetermined threshold $D_{store}$, making a decision to calculate and to store the subsequent rover point. The steps (B2-B3) are preferably repeated.

In one embodiment of the present invention, the first predetermined threshold is selected from the group consisting of: {a radio source positioning noise level; and a rover kinematic parameter}; wherein the rover kinematic parameter is selected from the group consisting of: {a minimum turning radius of the rover; and a baseline of the rover}.

A decision to calculate the heading of a rover, and a decision to calculate and to store a rover point in the memory block, are two different decisions. Indeed, the decision to calculate and to store the rover point is determined by the GPS noise, if the GPS system is used to determine the position fix of the rover, or by the noise of the any other navigation system used to determine the position fix of the rover. Thus, the first predetermined threshold $D_{store}$ is equal to GPS noise level, if a rover's kinematic parameter is small enough comparatively with the distance traveled. $D_{store}$ should also be more than the expected GPS position change between points due to measurement noise so that noise alone does not cause points to be stored.

Figure 3:
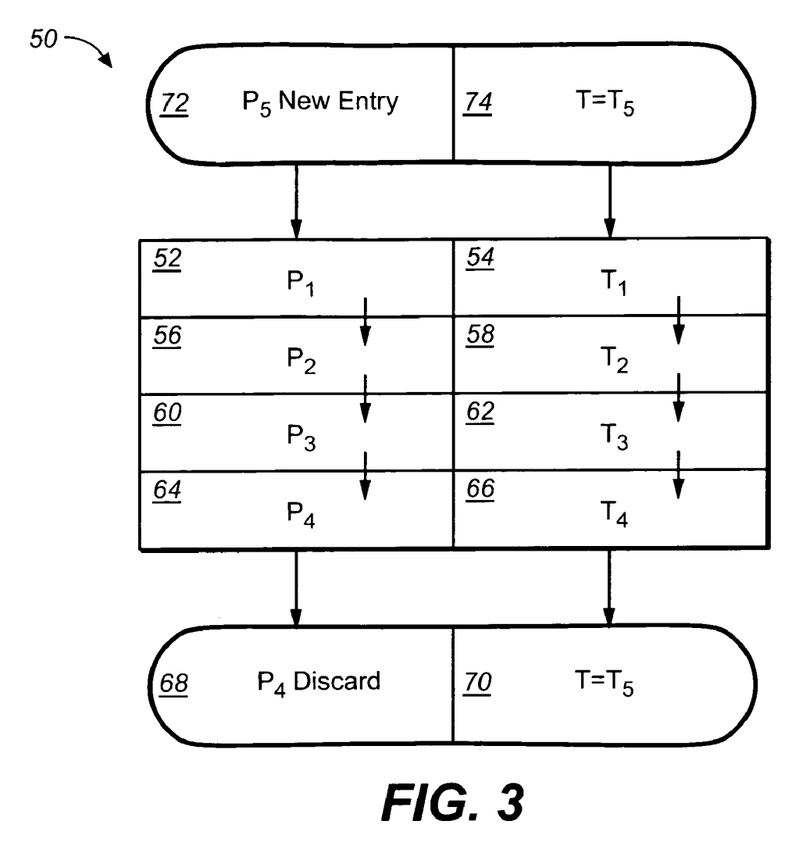
FIG. 3 shows an example of a memory block comprising 4 entries for 4 is different rover points comprising points $(P_1, T_1)$; $(P_2, T_2)$; $(P_3, T_3)$; and $(P_4, T_4)$ for the purposes of the present invention.

In one embodiment of the present invention, FIG. 3 shows an example of a circular memory block 50 comprising 4 entries for 4 different rover points comprising points ($P_1$, $T_1$); ($P_2$, $T_2$); ($P_3$, $T_3$); and ($P_4$, $T_4$); wherein the rover is in the position $P_1$ 52 at the time instant $T_1$ 54; the rover is in the position $P_2$ 56 at the time instant $T_2$ 58; the rover is in the position $P_3$ 60 at the time instant $T_3$ 62; and the rover is in the position $P_4$ 64 at the time instant $T_4$ 66.

At the time instant $T_5$ 74 at which the new position $P_{new}=P_5$ 72 of the rover is sufficiently different from the first stored position $P_1$ 52:

$$|P_{new} - P_1| > D_{store} \qquad (Eq.\ 6)$$

the new rover point $P_{new}$ 72 will replace the first stored position $P_1$ 52; the is the first stored rover point $P_1$ 52 will replace the second stored position $P_2$ 56; the second stored rover point $P_2$ 56 will replace the third stored position $P_3$ 60; the third stored rover point $P_3$ 60 will replace the fourth stored position point $P_4$ 64; and the fourth stored position $P_4$ 64 will be discarded.

On the other hand, the decision to determine the heading of the rover based on stored rover points is based on another parameter $D_{heading}$. This parameter $D_{heading}$ depends on how much the rover actually moved, or what is the actual distance traveled. Indeed, if the distance traveled, is small enough comparatively with the rover kinematic parameter, the decision to determine heading should be postponed, otherwise the result could be an indefinite heading:

$$D_{heading} > D_{store} \qquad (Eq.\ 7)$$

Thus, the algorithm to determine the rover's heading 2 based on its position points stored in the circular memory 50 of FIG. 3 can be described as follows:

$$\begin{aligned} &\text{For } i = 1 \text{ to } 4 \\ &\quad \text{if } |P_{new} - P_i| > D_{heading} \\ &\quad \text{calculate } \psi = \tan^{-1}(P_{new} - P_i) \end{aligned} \qquad (Eq.\ 8)$$

$D_{heading}$ needs to be large enough so that the noise on the two (or more) positions used to determine velocity is small relative to this threshold, so that when the $\tan^{-1}$ is calculated the noise is below the desired amount. On the other hand, $D_{heading}$ needs to be small enough so that the kinematics of the rover includes minimal standard deviation. It follows, that this algorithm is based on a point smoothing method. Based on the algorithm defined by (Eq. 8), the heading $\psi$ is determined up to 180 degrees for a rover with one degree of freedom.

In a circular memory having integer N entries (not shown) 50, there is a following empirical relationship between the $D_{heading}$ and $D_{store}$:

$$D_{store} \geq D_{critical} = \frac{D_{heading}}{N - 1} \qquad (Eq.\ 9)$$

If the noise is zero and the points are in a straight line, $D_{store}=D_{crtical}$, but for non-zero noise levels and curved trajectories, $D_{store}>D_{crtical}$ in order for the $D_{heading}$ threshold to be met by the points in the buffer. The computation of the optimal value is non-trivial but can be determined empirically.

Combining (Eq. 7) and (Eq. 9) gives the two bounds of $D_{store}$:

$$D_{heading} > D_{store} D_{heading}/(N-1) \qquad \text{(Eq. 10)}$$

$D_{store}$ is set between these two limits, according to the following tradeoffs. At large $D_{store}$, there are fewer points used in the buffer to determine velocity, increasing the error caused by changes in the rover's trajectory and reducing the rate at which the velocity is computed with unique points. On the other hand, at small $D_{store}$, the position noise and small radius path curvature can result in no points meeting the $D_{heading}$ spacing requirement at times, resulting in no new computation of heading.

The optimum value of $D_{store}$ for a given $D_{heading}$ value depends on both the spatial noise level and the trajectory characteristics of the rover.

For N=4, $D_{heading}=3 \times D_{store}$. Thus, we need to store at least three points to determine the heading of a rover.

In addition to heading, if a distance between at least two stored rover positions exceeds the second predetermined threshold $D_{heading}$, a current speed of the rover can be determine by computing a magnitude component of a vector distance between at least two stored rover positions, and by dividing the computed magnitude component of the vector distance between two stored rover points by a time difference between two stored rover points:

$$\text{For } i = 1 \text{ to } 4 \qquad \text{(Eq. 11)}$$
$$\text{if } |\vec{P}_{new} - \vec{P}_i| > D_{heading}$$
$$\text{calculate } \vec{V}_{new} = (\vec{P}_{new} - \vec{P}_i)/(T_{new} - T_i)$$

Figure 4:
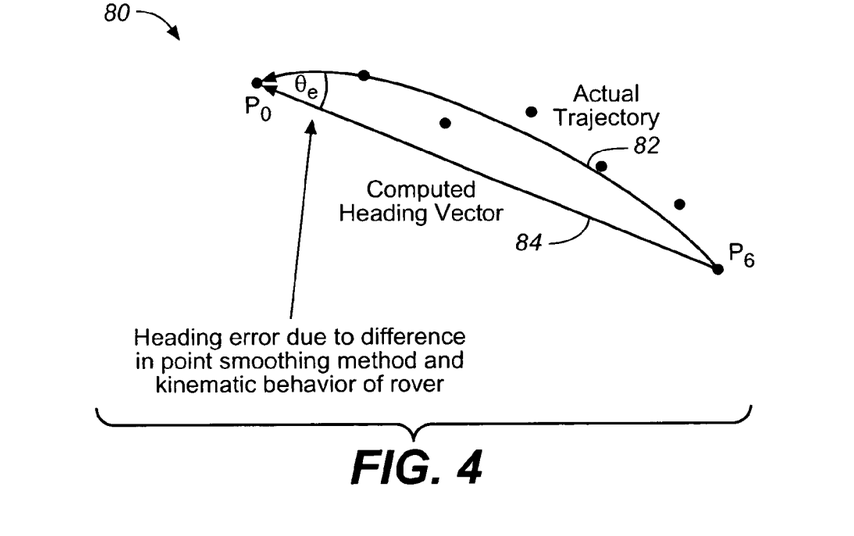
FIG. 4 illustrates the heading error due to difference between an actual trajectory of a rover and a calculated trajectory of the rover in a point smoothing method that is represented by algorithm of (Eq. 8) for the purposes of the present invention.

In one embodiment of the present invention, FIG. 4 is a diagram 80 that illustrates the heading error due to difference between an actual trajectory 82 of a rover and a computed trajectory 84 of the rover in a point smoothing method that is represented by algorithm of Eq. 8. The heading error can be minimized.

In one embodiment of the present invention, an error in determination of the current heading of the rover can be minimized by using a plurality of stored rover points in the memory block to calculate an average heading for each rover position.

Figure 5:
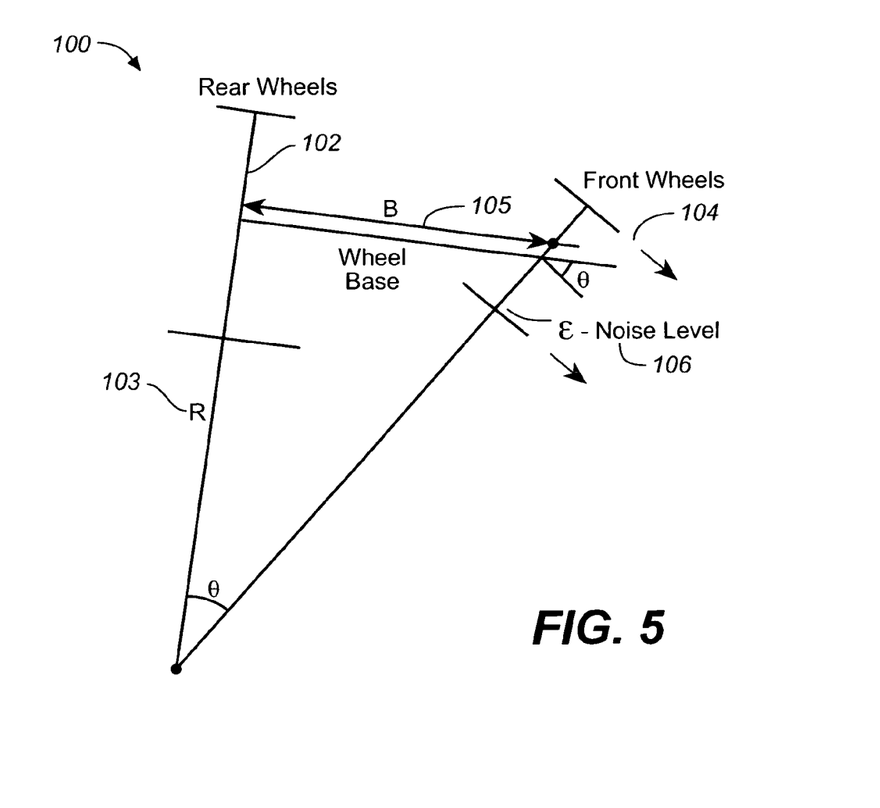
FIG. 5 shows the geometrical diagram that illustrates how to minimize an error parameter in determination of the current heading of the rover by fitting a straight line in a linear regression for the purposes of the present invention.

In one embodiment of the present invention, more specifically, FIG. 5 illustrates a geometrical diagram 100 that illustrates how to minimize an error parameter in determination of the current heading of the rover by fitting a straight line in a linear regression. Here, the kinematic parameter of the rover R 103 is determined by the distance B 105 between the rear wheels and front wheels of the rover. The error parameter E 105 (or noise level) can be determined as follows:

$$\varepsilon = \frac{R}{\sin \tan^{-1}(B/R)} - R \qquad \text{(Eq. 12)}$$

Another aspect of the present invention is directed to an apparatus for determining speed and heading of a rover/rover having one degree of freedom.

In one embodiment, the apparatus of the present invention comprises: (A) a means for determining a rover position coordinates; (B) a means for storing a set of statistically different rover points; and (C) a means for determining a speed and a heading of the rover by using a subset of rover points including a plurality of stored rover points and a current rover point.

In one embodiment of the present invention, the means (A) further comprises: (A1) at least one source of a radio position measurements. In this embodiment of the present invention, each source of radio position measurements is selected from the group consisting of: {a carrier differential SATPS; a code differential SATPS; an autonomous SATPS; an Inertial Navigation System (INS); and a Pseudolite-Based Positioning System}.

In one embodiment of the present invention, the means (B) further comprises: (B1) a memory block configured to store the set of statistically different rover points; and (B2) a memory computer means. In this embodiment of the present invention, the memory computer means is configured to perform the algorithm comprising at least the following steps: calculating a distance between the subsequent rover position and a previous rover position; and making a decision to calculate the subsequent rover point in the memory block if the calculated distance is greater than a first predetermined threshold $D_{store}$.

In one embodiment of the present invention, the means (B) further comprises: (B3) an N point circular buffer configured to store the set of statistically different rover points, N being an integer; and (B4) a memory computer means. In this embodiment of the present invention, the memory computer means is configured to perform the algorithm comprising at least the is following steps: storing an initial rover point in the N point circular buffer; determining whether a current rover point is a statistically different rover point by calculating a distance between the current rover position and a previous rover position; if the calculated distance is greater than the first predetermined threshold $D_{store}$, making a decision to insert the current rover point in the N point circular buffer; and if the calculated distance is greater than the first predetermined threshold $D_{store}$, making a decision to discard a first stored rover point.

In one embodiment of the present invention, the means (C) further comprises: (C1) a computer means configured to calculate the speed and the heading of the rover by using the subset of rover points including the plurality of stored rover points and the current rover point.

In one embodiment of the present invention, the means (C) further comprises: (C2) a computer means configured to perform the algorithm comprising at least the following step: if a distance between at least two stored rover positions exceeds a second predetermined threshold $D_{heading}$, determining a current heading of the rover by computing an angle component of a vector distance between at least two stored statistically different rover positions.

In one embodiment of the present invention, the means (C) further comprises: (C3) a computer means configured to perform the algorithm comprising at least the following step: determining a current heading of the rover by computing an angle component of a vector distance between at least one stored rover position and the current rover position.

In one embodiment of the present invention, the means (C) further comprises: (C4) a computer means configured to perform the algorithm comprising at least the following steps: if a distance between at least two stored rover positions exceeds the second predetermined threshold $D_{heading}$, determining a current speed of the rover by computing a magnitude component of a vector distance between at least two stored rover positions, and by dividing the computed magnitude component of the vector distance between two stored rover points by a time difference between two stored rover points.

In one embodiment of the present invention, the means (C) further comprises: (C5) a computer means configured to perform the algorithm comprising at least the following steps: determining a current speed of the rover by computing a magnitude component of a vector distance between at least one stored rover position and the current rover position, and by dividing the computed magnitude component of the vector distance between at least one stored rover position and the current rover position by a time difference between at least one stored rover point and the current rover point.

It is known to a person skillful in the art how to implement the memory means and computer means configured to perform the steps of algorithms of the present invention.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of determining speed and heading of a rover having one degree of freedom and having an indefiniteness in heading while operating at substantially low speed, said method comprising the steps of:
   (A) determining a rover position coordinates using at least one source of a radio position measurements;
   (B1) storing an initial rover point in a memory block; wherein each said rover point comprises a time Epoch and a rover position determined at said time Epoch; wherein each said pair of said statistically different rover points comprises two rover positions separated by a statistically significant distance; and wherein said memory block further comprises an N point circular buffer, N being an integer;
   (B2) determining whether a subsequent rover point is a statistically different rover point by calculating a distance between said subsequent rover position and a previous rover position;
   (B3) if said calculated distance is greater than a first predetermined threshold, making a decision to calculate and to store said subsequent rover point in said N point circular buffer;
   (B6) determining whether a current rover point is a statistically different rover point by calculating a distance between said current rover position and a newest stored rover's position that meets a heading spacing requirement;
   (B7) if said calculated distance is greater than said first predetermined threshold, making a decision to calculate and to insert said current rover point in said N point circular buffer;
   (B8) if said calculated distance is greater than said first predetermined threshold, making a decision to discard a first stored rover point; and (C1) if a distance between at least two stored rover positions exceeds a second predetermined threshold $D_{heading}$, using said at least two statistically different rover points to determine a current heading of said rover by computing an angle component of a vector distance between said at least two stored statistically different rover positions; and if no two points are spaced further than said second predetermined threshold $D_{heading}$, using the last computed heading as a current heading of said rover.

2. The method of claim 1, wherein said step (A) further comprises the step of:
   (A1) selecting said source of radio position measurements from the group consisting of: {a carrier differential SATPS; a code differential SATPS; an autonomous SATPS; an Inertial Navigation System (INS); and a Pseudolite-Based Positioning System}.

3. The method of claim 1, wherein said step (B3) further comprises the step of:
   (B3, 1) determining said first predetermined threshold by using a set of parameters selected from the group consisting of: {a radio source positioning noise level; and a rover kinematic parameter}; wherein said rover kinematic parameter is selected from the group consisting of: {a minimum turning radius of said rover; and a baseline of said rover}.

4. The method of claim 1, wherein said step (C1) further comprises the step of:
   (C1, 1) determining a current heading of said rover by computing an angle component of a vector distance between said at least one stored rover position and said current rover position.

5. The method of claim 1, wherein said step (C1) further comprises the step of:
   (C1, 2) if a distance between at least two stored rover positions exceeds said second predetermined threshold $D_{heading}$, determining a current speed of said rover by computing a magnitude component of a vector distance between said at least two stored rover positions, and by dividing said computed magnitude component of said vector distance between said two stored rover points by a time difference between said two stored rover points.

6. The method of claim 1, wherein said step (C1) further comprises the step of:
   (C1, 3) determining a current speed of said rover by computing a magnitude component of a vector distance between said at least one stored rover position and said current rover position, and by dividing said computed magnitude component of said vector distance between said at least one stored rover position and said current rover position by a time difference between said at least one stored rover point and said current rover point.

7. The method of claim 1, wherein said step (C1) further comprises the steps of:
   (C1, 4) repeating said step (C1) for a substantially sufficient number of pairs of stored rover points; and
   (C1, 5) minimizing an error in determination of said current heading of said rover by optimizing said step (C1, 4) for a plurality of obtained headings of said rover.

8. The method of claim 7, wherein said step (C1, 5) further comprises the step of:
   (C1, 5, 1) minimizing an error parameter in determination of said current heading of said rover by fitting a straight line in a linear regression; wherein said error parameter is selected from the group consisting of: {a standard deviation; and a variance}.

9. The method of claim 7, wherein said step (C1, 5) further comprises the steps of:
(C1, 5, 2) minimizing said error parameter by fitting a circular arc curve line in a circular regression; wherein said error parameter is selected from the group consisting of: {a standard deviation; and a variance};
and
(C1, 5, 3) determining a current heading of said rover by using a stored rover position on said curve closest to said current rover position.

10. The method of claim 7, wherein said step (C1, 5) further comprises the steps of:
(C1, 5, 4) minimizing said error parameter by fitting a smooth curve line in an optimal sense; wherein said error parameter is selected from the group consisting of: {a standard deviation; and a variance};
and
(C1, 5, 5) finding an optimal point on said curve to determine a current heading of said rover.

11. An apparatus for determining speed and heading of a rover having one degree of freedom and having an indefiniteness in heading while operating at substantially low speed, said apparatus comprising:
(A) a means for determining a rover position coordinates;
(B1) a memory block configured to store said set of statistically different rover points; said memory block comprising an N point circular buffer, N being an integer; wherein each said rover point comprises a time Epoch and a rover position determined at said time Epoch; wherein each said pair of said statistically different rover points comprises two rover positions separated by a statistically significant distance;
and
(B2) a computer means configured to perform the algorithm comprising at least the following steps:
storing an initial rover point in said N point circular buffer;
determining whether a current rover point is a statistically different rover point by calculating a distance between said current rover position and a newest stored rover position that meets a heading spacing requirement;
if said calculated distance is greater than a first predetermined threshold $D_{store}$, making a decision to insert said current rover point in the N point circular buffer;
if said calculated distance is greater than said first predetermined threshold $D_{store}$, making a decision to discard a first stored rover point;
and
if a distance between at least two stored rover positions exceeds a second predetermined threshold $D_{heading}$, determining a current heading of said rover by computing an angle component of a vector distance between said at least two stored statistically different rover positions.

12. The apparatus of claim 11, wherein said means (A) further comprises:
(A1) at least one source of a radio position measurements; wherein each said source of radio position measurements is selected from the group consisting of: {a carrier differential SATPS; a code differential SATPS; an autonomous SATPS; an Inertial Navigation System (INS); and a Pseudolite-Based Positioning System}.

13. The apparatus of claim 11, wherein said computer means (B2) configured to perform the algorithm comprising at least the following step:
determining a current heading of said rover by computing an angle component of a vector distance between said at least one stored rover position and said current rover position.

14. The apparatus of claim 11, wherein said computer means (B2) configured to perform the algorithm comprising at least the following steps: if a distance between at least two stored rover positions exceeds said second predetermined threshold $D_{heading}$, determining a current speed of said rover by computing a magnitude component of a vector distance between said at least two stored rover positions, and by dividing said computed magnitude component of said vector distance between said two stored rover points by a time difference between said two stored rover points.

15. The apparatus of claim 11, wherein said computer means (B2) configured to perform the algorithm comprising at least the following steps:
determining a current speed of said rover by computing a magnitude component of a vector distance between said at least one stored rover position and said current rover position, and by dividing said computed magnitude component of said vector distance between said at least one stored rover position and said current rover position by a time difference between said at least one stored rover point and said current rover point.

16. A computer-readable storage medium useful in association with a radio navigation chip, said chip having a processor and memory, said chip is configured to determine speed and heading of a rover having one degree of freedom and having an indefiniteness in heading while operating at substantially low speed, said computer-readable storage medium including computer-readable code instructions configured to cause said processor to execute the steps of:
(A) determining a rover position coordinates using at least one source of a radio position measurements;
(B) storing an initial rover point in said N point circular buffer;
(C) determining whether a current rover point is a statistically different rover point by calculating a distance between said current rover position and a newest stored rover position that meets a heading spacing requirement;
(D) if said calculated distance is greater than a first predetermined threshold $D_{store}$, making a decision to insert said current rover point in the N point circular buffer;
(E) if said calculated distance is greater than said first predetermined threshold $D_{store}$, making a decision to discard a first stored rover point;
and
(F) if a distance between at least two stored rover positions exceeds a second predetermined threshold $D_{heading}$, determining a current heading of said rover by computing an angle component of a vector distance between said at least two stored statistically different rover positions.

17. A computer program product that includes a computer-readable medium having a sequence of instructions which, when executed by a processor, causes the processor to execute a process for determining speed and heading of a rover having one degree of freedom and having an indefiniteness in heading while operating at substantially low speed; said process comprising:
(A) determining a rover position coordinates using at least one source of a radio position measurements;
(B) storing an initial rover point in said N point circular buffer;

(C) determining whether a current rover point is a statistically different rover point by calculating a distance between said current rover position and a newest stored rover position that meets a heading spacing requirement;

(D) if said calculated distance is greater than a first predetermined threshold $D_{store}$, making a decision to insert said current rover point in the N point circular buffer;

(E) if said calculated distance is greater than said first predetermined threshold $D_{store}$, making a decision to discard a first stored rover point;

and (F) if a distance between at least two stored rover positions exceeds a second predetermined threshold $D_{heading}$, determining a current heading of said rover by computing an angle component of a vector distance between said at least two stored statistically different rover positions.

* * * * *